C. ELLIS.
TREATING OILS, &c.
APPLICATION FILED JUNE 3, 1913.
1,216,971.
Patented Feb. 20, 1917.
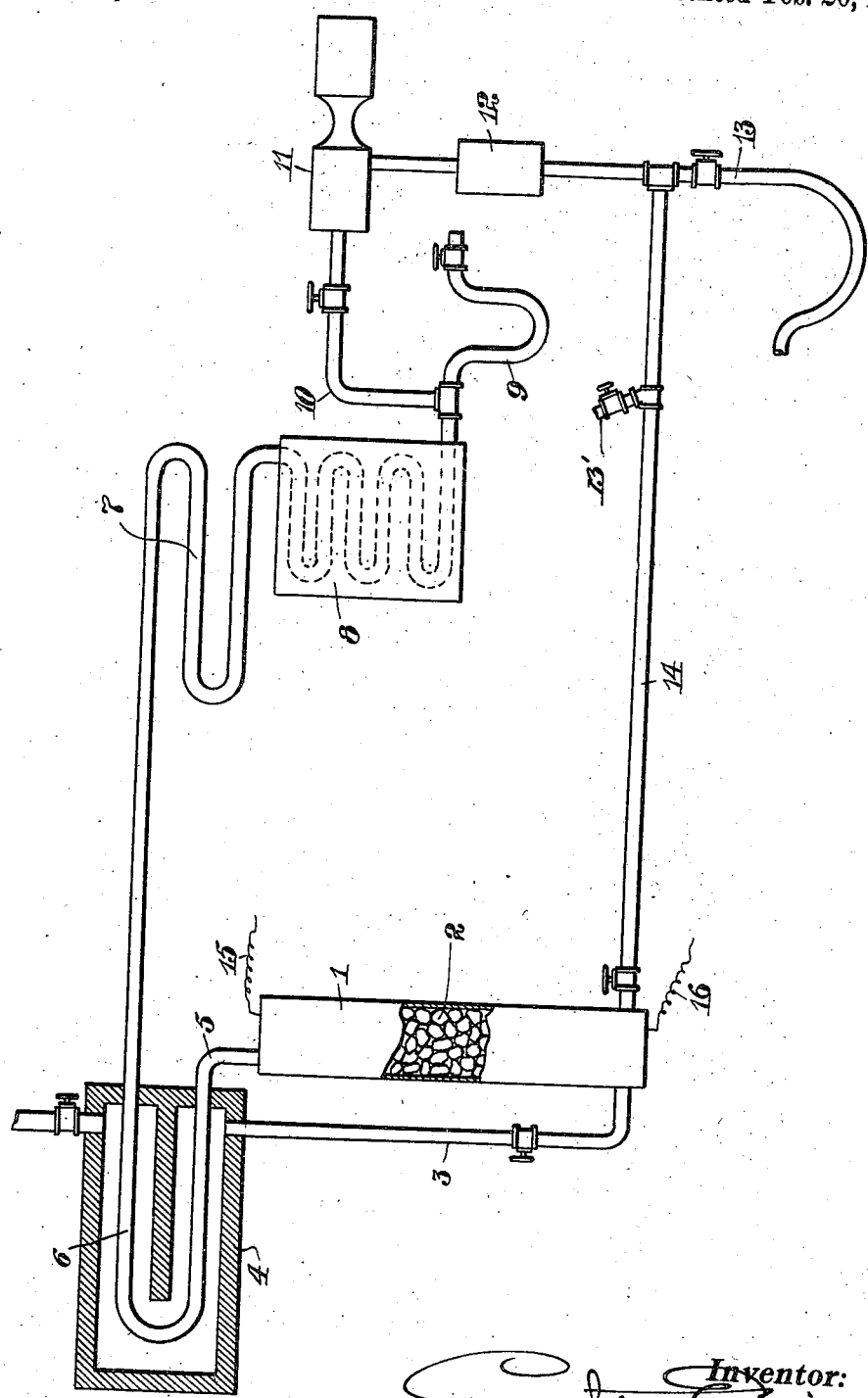

UNITED STATES PATENT OFFICE.

CARLETON ELLIS, OF MONTCLAIR, NEW JERSEY.

TREATING OILS, &c.

1,216,971.   Specification of Letters Patent.   Patented Feb. 20, 1917.

Application filed June 3, 1913. Serial No. 771,435.

*To all whom it may concern:*

Be it known that I, CARLETON ELLIS, a citizen of the United States, and a resident of Montclair, in the county of Essex and State of New Jersey, have invented certain new and useful Improvements in Treating Oils, etc., of which the following is a specification.

This invention relates to the production of gasolene and similar material by the thermal decomposition of heavier oils by which decomposition products of lower boiling point together with gaseous bodies are formed and relates in particular to thermal decomposition followed if desired by compression of the gaseous bodies evolved whereby the light condensable products are removed; thereby permitting if desired the use of the fixed gases for subsequent contact with the vapors of the raw material entering the apparatus in which the thermal decomposition is carried out; thereby through partial pressure and mass action tending to reduce the loss of the raw material by avoiding to a large extent decomposition into fixed gas while also aiding in effecting the selective disintegration of the oil substantially into the products desired.

The decomposition of oils heavier than gasolene, as for instance kerosene, to produce gasolene and the like gives rise to products which often form a smoke or fog in the gases which are evolved, this fog passing through the water condenser even when the water-cooling medium is chilled with ice, and sometimes even after passing through scrubbing towers containing oil which ordinarily would be expected to remove such suspended particles.

The loss of the light products in this way often is considerable and by the present invention a substantially complete recovery of the products forming this peculiar resistant mist may be effected and the mist-freed gases are put into a condition where they may be used to advantage for creating the mass action effect referred to above, or to furnish power for compressing the wet gas or for heating or for other purposes.

In carrying out my invention, I may pass the oil, as for example kerosene, through heated conduits to raise the temperature of the kerosene vapors to say 550°–600° C. and preferably contact these vapors with suitable catalytic material if desired in the presence of water vapor. The vapors containing the products of dissociation are removed, passed through the usual (air and) water condenser where preferably the gasolenes are largely separated from the heavier oil and the gases containing the resistant mist-forming particles are conveyed to a compressor by means of which the gases are brought to a pressure of preferably 300 lbs. per square inch or more. During this step or subsequent to it, the gases may be further chilled and the light liquid products which are separated under these circumstances, are collected and may then be added to the light products derived by ordinary condensation. The gases which are largely or wholly freed from the condensable products are in part at least carried to the heat decomposing portion of the apparatus and mixed with the vapors of the raw material entering same. Approximately the same volume of gas may be added to the raw material as would be produced by the decomposition of the raw material without the added gas so that in the case of kerosene vapors producing gaseous bodies say 10% by volume about 10 per cent. of recovered gas would be charged or a sufficient amount of gas mixed with the oil in advance of heating as would tend to aid in the reduction of the gross amount of gas generated during the operation.

The entire apparatus may be operated under pressure, as for instance, by allowing the gas compressed during the operation after removing the mist-forming particles to enter the heat decomposing apparatus in such a way that the pressure of these gases is availed of so that the heat decomposing zone may be maintained, if desired, under several atmospheres.

The heat decomposing zone may be maintained through the agency of electrolytically generated heat, as for instance, by making a resistor bed of coke or other resistant granular material and passing an electric current therethrough so that the rough surface of the coke or similar material may become heated to a red heat or other suitable temperature, causing the vapors of the oil to pass through this zone where they are subjected to the combined effect of heat, catalytic surfaces and electric action. By running the resistance heater under a high current density a great volume of the heat vapors may be passed through a relatively small heater in a very short time as the regulation of the flow of the vapors with respect to the evolved heat enables satisfactory control. The hot vapors leaving the resistance element may be conveyed through a recuperator or a heat interchanger so that the waste heat of the vapors is given up to the cold raw material entering the apparatus. Super-heated vapors may be, if desired, further heated by the surplus gas derived during the process so that these vapors enter the electrical zone at a temperature which requires but little further rise of temperature within the zone of electrification, and thus economy in the energy cost of the process is secured.

The accompanying drawing shows partly in elevation and partly in vertical section a form of organization adapted for carrying out the process herein. In the drawings 1 is a receptacle containing the resistor material 2. A pipe 3 for the admission of oil or oil vapors connects with the recuperator 4 in which is situated the coil 6 connected by the pipe 5 with the heating element 1. From the recuperator the outlet pipe leads to the air condenser 7 and water condenser 8. 9 is a trap for the removal of the condensed material. A vent pipe 10 leads to the compressor pump 11 which in turn connects with the heating element 1 by means of a pipe 14 in which is interposed chilling or refrigerating apparatus 12 of any suitable type. The pipe 14 is provided with the liquid draw-off pipe 13 and with the gas take-off pipe 13'. In operating the process according to this apparatus the resistor material 2 which may be coke or other suitable material is brought to the requisite temperature by the passage of an electric current through the mass, leads for this purpose being shown at 15 and 16. The oil or oil vapors introduced into the chamber 4 pass through the pipe 3 into the heating element 1 and are duly decomposed, preferably in the presence of gases entering by the pipe 14. The products of decomposition pass through the recuperator coil 6, the air condenser 7, the water condenser 8 and finally the liquid portion is withdrawn at 9. The vapor and gas portion taken by the pipe 10 to the pump 11 are then compressed to separate as much liquid material as possible. The liquid material is withdrawn at 13 and such portion of the gas as may be desired for use in the heating element is returned by the pipe 14.

Another feature of my invention is that of maintaining a sufficient pressure in the decomposing apparatus or tubes as to substantially prevent the kerosene or other oil material which is being treated, from being converted into vapor, so that the liquid oil flows along a conduit being gradually heated to higher and higher temperatures preferably below the tar forming point until a substantial part has been converted into gasolene and other light oils. The operation under pressure as a traveling stream enables large quantities of oil to be heated and exposed if desired to catalytic action without undesirable formation of tar or coke.

As an illustration of the preferred form of my invention and one which includes the several features enumerated above, kerosene oil of 43° Baumé, in conjunction with about 10% of its weight of oil gas and a smaller quantity approximately 5%, of steam is passed through a tube containing resistor material of coke, which is electrically heated. The oil is vaporized and mixes with the oil gas. In contact with the rough surfaces of the heated coke, the kerosene is broken down, yielding a quantity of gasolene. A temperature of 500° to 600° or more is preferably maintained in the heating zone. The products of decomposition pass to an air condenser where heavier portions are removed, then go to a water condenser, where the bulk of the gasolene is condensed. The gases which entrain some of the condensable products are compressed to 300 pounds and light gasolene obtained as above. The oil gas remaining is in part (approximately one fourth) returned to the heating zone to there meet with fresh quantities of oil vapor. The decomposition of oils in contact with their own products of heat decomposition or gaseous products, intentionally added to restrain and direct certain reactions, enables a control over the operation which has divers useful or commercial applications.

What I claim is:

1. The herein described process of making gasolene-like material which consists in subjecting decomposition products of petroleum oil heavier than gasolene and containing mist forming bodies in the presence of added gaseous decomposition products of petroleum oil heavier than gasolene to compression whereby mist forming bodies are condensed.

2. The herein described process of making gasolene-like material which consists in subjecting decomposition products of petroleum oil heavier than gasolene and containing mist forming bodies in the presence of added gaseous decomposition products of petroleum oil heavier than gasolene to the cooling action of a condenser and to compression whereby mist forming bodies are condensed.

3. The herein described process of making gasolene-like material which consists in subjecting a petroleum oil heavier than gasolene in the presence of added gaseous decomposition products of petroleum oil heavier than gasolene to a decomposing temperature and compressing the resulting products and separating the thus condensed portion from the uncondensed portion.

4. The herein described process of making gasolene-like material which consists in subjecting a petroleum oil heavier than gasolene in the presence of added petroleum gaseous decomposition products to a decomposing temperature, cooling and compressing the resulting products and separating the thus condensed portion from the uncondensed portion.

5. The process of making gasolene and the like which comprises heating an oil heavier than gasolene, as for instance kerosene, to a decomposing temperature in passing the products of decomposition through a condenser and in separating the liquid portion from the gas, in compressing the gas and removing further liquefiable products, and in adding a quantity of the gas to the raw material entering the zone of heat decomposition.

6. The process of making gasolene and the like which comprises heating kerosene to produce lighter products, in condensing the readily liquefiable products by passage through a water cooler condenser, in subjecting the residual gases carrying dissolved and suspended condensable products to a pressure of approximately 300 pounds, in removing the liquefied material, and in admixing a portion at least of the so-treated gas with the kerosene vapor entering the zone of heat decomposition.

Signed at Montclair, in the county of Essex and State of New Jersey, this 2nd day of June, A. D. 1913.

CARLETON ELLIS.

Witnesses:
B. M. ELLIS,
THOS. F. ROCHE.